[19] United States Patent
Krausse et al.

[11] Patent Number: 5,028,114
[45] Date of Patent: Jul. 2, 1991

[54] PLUG CONNECTOR FOR FIBER OPTIC CABLES

[75] Inventors: Peter Krausse, Aschheim; Klaus Hirseland, Germering, both of Fed. Rep. of Germany

[73] Assignee: Siemens Aktiengesellschaft, Munich, Fed. Rep. of Germany

[21] Appl. No.: 395,998

[22] Filed: Aug. 21, 1989

[30] Foreign Application Priority Data

Sep. 29, 1988 [DE] Fed. Rep. of Germany ... 8812341[U]
Jan. 20, 1989 [DE] Fed. Rep. of Germany ... 8900623[U]

[51] Int. Cl.$^5$ .............................................. G02B 6/36
[52] U.S. Cl. .............................. 350/96.20; 350/96.21
[58] Field of Search ............... 350/96.20, 96.21, 96.22

[56] References Cited

U.S. PATENT DOCUMENTS

| | | | |
|---|---|---|---|
| 4,008,948 | 2/1977 | Dalgleish et al. | 350/96.21 |
| 4,279,469 | 7/1981 | Forman | 350/96.22 |
| 4,568,145 | 2/1986 | Colin et al. | 350/96.21 X |
| 4,687,292 | 8/1987 | Krausse | 350/96.20 X |
| 4,749,251 | 6/1988 | Moulin | 350/96.20 |
| 4,805,978 | 2/1989 | Bruch et al. | 350/96.20 |
| 4,832,435 | 5/1989 | Suzuki et al. | 350/96.20 |

Primary Examiner—John D. Lee
Assistant Examiner—Phan T. Heartney
Attorney, Agent, or Firm—Hill, Van Santen, Steadman & Simpson

[57] ABSTRACT

A plug connector assembly for fiber optic cables. The connector assembly provides for maintaining an optimal orientation of the fiber optic cables to be connected. In a preferred embodiment, each plug to be used in the connector assembly includes a sleeve having a longitudinal ridge which fits into a groove provided in a ring nut affixed to a plug housing. The invention also provides structure for limiting the torque applied when securing the plug, thus preventing over-tightening and preserving the rotational orientation of the plugs.

8 Claims, 3 Drawing Sheets

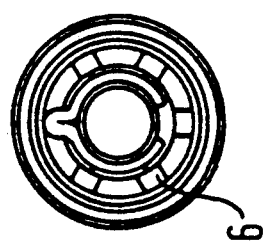
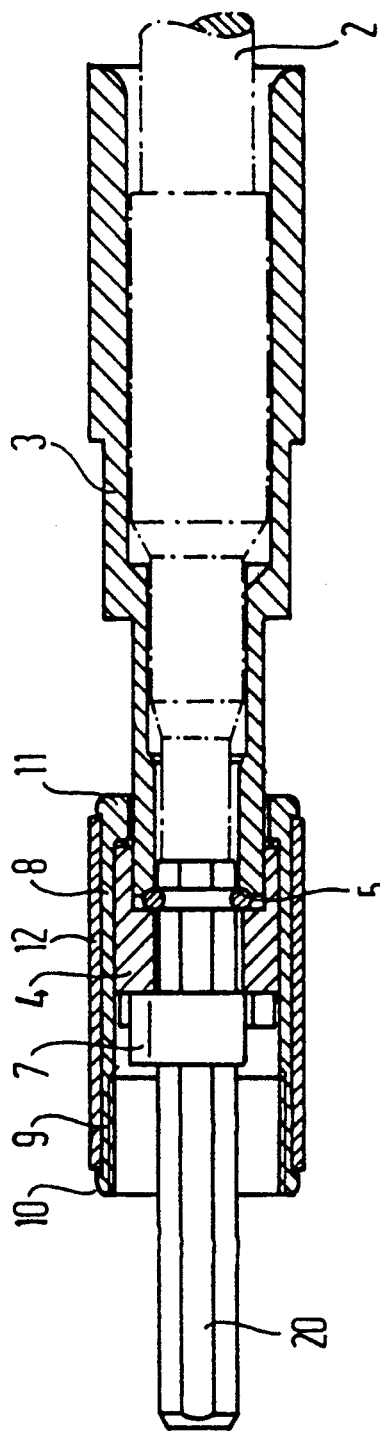
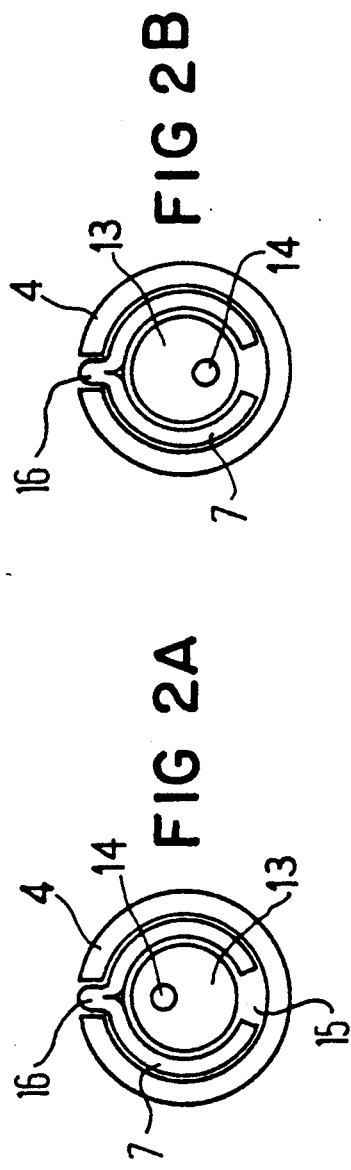

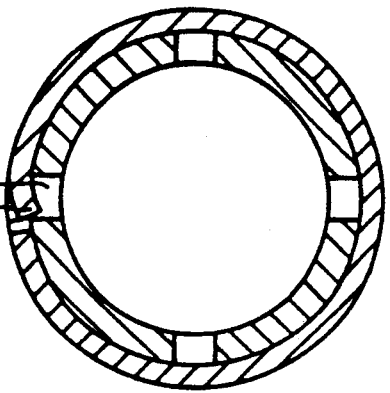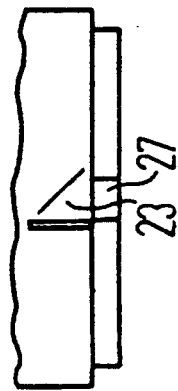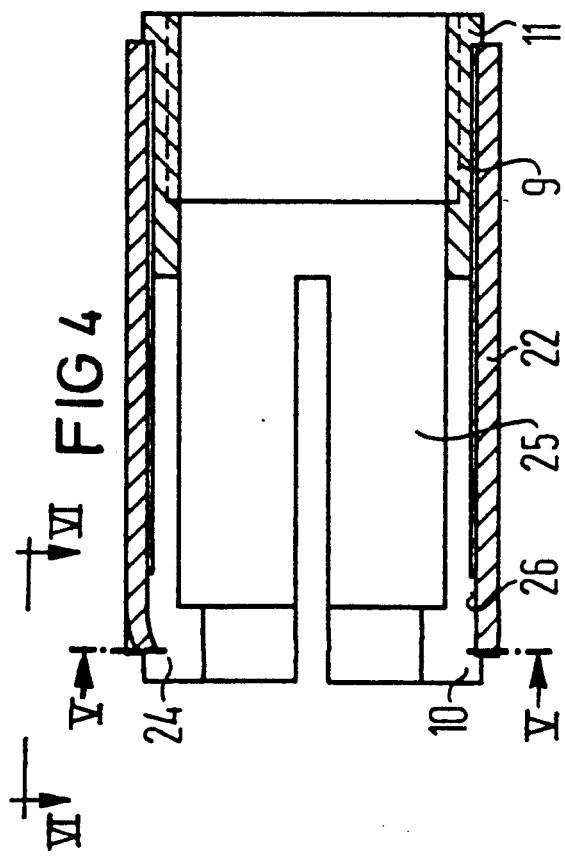

PLUG CONNECTOR FOR FIBER OPTIC CABLES

TECHNICAL FIELD

This invention relates to plug connector assemblies for the connection of fiber optic cables.

BACKGROUND OF THE INVENTION

Fiber optic cables are often joined to one another, or connected to receiving devices, using connectors wherein the end of the light waveguide fiber is fixed in a capillary of a plug pin. The front end of each such pin is coplanar with the end of the optical fiber, and a protective fastening sleeve is provided that is connectable with for example, a rack wall, a slide-in module wall, or a coupler for another cable. The sleeve acts as a guide bush for the acceptance of the plug pins, and its outside circumference is threaded for fastening the plugs, which are provided with union nuts.

A fiber optic plug connector of this type is disclosed in EPA 0 164 531. In this interchangeable plug connector, a hard metal sleeve is provided as guide bush. The sleeve has precisely machined inside surfaces that correspond in size to the outside diameters of the plugs, which are insertable into the sleeve from both sides.

Previously known connectors, however, make no provision for misalignment of the fibers, or optical centers, of the cables to be connected. Such misalignment occurs when the optical center of the cable end is eccentric with respect to the longitudinal axis of the cable. Such eccentricity may be due, for example, to variations in cable manufacturing tolerances. If the optical center of a cable is misaligned with the apparatus with which it is connected, light passing through the connection is attenuated, and transmission quality may be degraded.

SUMMARY OF THE INVENTION

The present invention more specifically relates to a plug connector assembly for fiber optic cables that maintains the rotational position of the optical center of a fiber optic cable in a fixed and predetermined relationship with a plug housing.

It is therefore a primary object of the present invention to provide a plug connector assembly for fiber optic cables that provides for the correct alignment of optical centers of connected cables despite their eccentricity.

It is another object of the present invention to provide a connector assembly including a threaded portion to secure the assembly to a receiving device.

It is a further object of this invention to provide a connector assembly including a union nut having an internally threaded central bore and being surrounded by a friction clutch sleeve to prevent over-tightening of the connector.

It is yet another object of this invention to provide a connector assembly including a union nut having a plurality of radially spaced longitudinal apertures and a raised annular surface at one of its ends, and a cylindrical ratchet sleeve with resilient tabs engaging the apertures or the raised annular surface, in order to prevent over-tightening of the connector.

In attainment of the foregoing objects, a plug connector assembly is disclosed including at least one plug and plug housing. Each plug corresponds to a fiber optic cable having an end face with an optical center. The invention provides for the proper orientation of the optical center of fiber optic cable. In a preferred embodiment, proper orientation is accomplished by affixing a sleeve to a plug pin. The sleeve is provided with a longitudinal ridge diametrically opposed to a longitudinal slot. The sleeve is affixed to the plug pin so that the optical center of the cable is aligned with a diameter of the plug pin that bisects both the ridge and the slot. The ridge slides into a longitudinal groove provided in an interior bore of a cylindrical ring nut affixed to the plug housing, thus positively orienting the optical center of the fiber optic cable with respect to the connector. The ring nut may be provided with a plurality of radially spaced grooves to allow for adjustability of the position of the optical center.

Other objects and advantages of the present invention will become apparent upon reference to the accompanying description taken in conjunction with the following drawings.

BRIEF DESCRIPTION OF THE DRAWINGS

FIGS. 1A is a sectional view of a plug assembly embodying some features of the present invention.

FIG. 1B is an end view of a plug assembly similar to that in FIG. 1A.

FIGS. 2A and 2B are sectional views illustrating the orientation of the optical center of a fiber optic cable.

FIG. 4 is a sectional view of a ratchet mechanism for use with fiber optic cable connectors.

FIG. 5 is a sectional view taken along lines V—V of FIG. 4.

FIG. 6 is a top view taken along lines VI—VI of FIG. 4.

DESCRIPTION OF THE PREFERRED EMBODIMENTS

Figure 3:
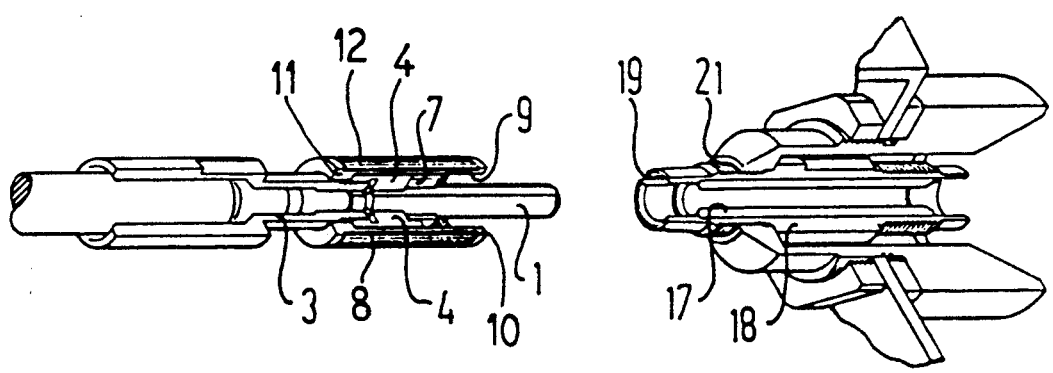
FIG. 3 is an exploded view in partial section of a plug connector assembly incorporating features of the present invention.

As shown in FIG. 1, a plug housing 3 is slipped over an incoming fiber optic cable 2, and a plug 1 projects from the front end of the plug housing 3. In its center, this plug carries the optical fibers in a capillary. The front end of the plug and the cable end are ground flat to enable them to fit together. The plug 1 is affixed to the plug housing 3 and secured in position via a ring nut 4 having an interior clamp ring 5. A longitudinally slotted sleeve 7 is slipped onto the leading end of the plug after which the sleeve 7 is clamped onto the plug to form a fold or ridge 16 diagonally opposite a slot 15. The ring nut 4 has radially spaced grooves 6 at its front side into one of which the ridge 16 engages in the axial direction. The ridge occupies only one of the radial grooves 6 at a time, as shown in FIG. 2. The longitudinally slotted sleeve 7 is placed into the groove 6 so that the optical center 14 of fiber core 13 is located on the same diameter line on which the fold lies. As shown in FIGS. 2A and 2B the optical center 14 can be proximal either to the ridge 16 or the slot 15. However, care must be taken to ensure, when two such cables are connected together, that their optical centers are secured with the same slot/ridge orientation. Either arrangement leads to the same result: namely a reduction of the attenuation of a plug connector by reducing the eccentricity of the two coupled fibers relative to one another.

By adjusting an anti-twist mechanism to an attenuation minimum with reference to a standard plug having defined eccentricity in a known direction as well as largely ideal geometrical shapes and dimensions, the influences of all geometrical tolerances (eccentricity, squint angle, face angle, etc.) can be minimized.

FIG. 3 shows a centering sleeve 17 that is surrounded by a slide-in module mount 18. Since longitudinal slots 19 for the ridges of two plugs 1 to be connected via the sleeve are provided at the two ends of the mount 18, the orientation of the plugs is established. A cooperating plug (not shown) is to be plugged into the sleeve 17 from the right and is fundamentally the same as the plug shown in FIG. 1.

In order to axially lock the plug 1 with the sleeve 17 and 18, a union nut 8 is provided having interior threads 9 to threadedly engage the outside thread 21 of the sleeve 18. In order to preserve the rotational orientation of the cables, and to prevent over-tightening of the plug, a torque limiter is provided on the union nut 8. In a first embodiment of this torque limiter, a resilient, longitudinally slotted sleeve 12 is located between the collars 10 and 11 of the union nut. This outwardly knurled sleeve 12 has a slightly smaller inside diameter than corresponds to the cylindrical outer surface of the union nut 8. The collars limit axial play of the sleeve 12, and a friction clutch is created by the frictional engagement between the parts 12 and 8, so that tightening movement of the thread 9 is limited. The result is a fiber optic plug assembly that is optimally effective in both optical and mechanical terms.

A slight bevel 20 of the plug 1 is also shown in FIG. 1, this enabling the escape of air when two such plugs are connected together via the connecting sleeve 17, since these parts are preferably machined to provide a tight fit.

FIGS. 4 through 6 show a second embodiment of a torque limiter, where the union nut has a plurality of radially spaced longitudinal apertures 27. Over a short segment 26 of an end region 24 of the union nut 25, there is a raised annular surface which has a slightly greater diameter than the inside diameter of sleeve 22. Since torque limitation is required only in the tightening direction, the sleeve is longitudinally slotted over a short distance at a location at the circumference at one end. Resilient tabs 23 on a ratchet sleeve 22 slide over the raised annular surface when the sleeve is rotated in the tightening direction. A ratchet effect is produced since the tabs glide over the apertures in tightening direction until the required tightening torque is achieved. In the opposite (loosening) direction, however, the resilient tabs 23 spring into one of the apertures 27 as shown in FIG. 5, so that the full torque is transmitted from the sleeve 22 onto the union nut 8 (in the fashion of a ratchet) when the union nut 8 is loosened. A reliable disengagement of the thread from the corresponding cooperating thread is thereby guaranteed.

It is especially advantageous if the sleeve 22 is rigid, so that the torque cannot be increased by firmly grasping and turning the sleeve. The ratcheting when the union nut 8 is tightened provides a signal that the required tightening torque has been achieved.

For assembly, the sleeve 22 is slipped over the spring-borne collar 10 of the union nut until it is seated against the collar 11 that lies opposite.

Although we have described our invention by reference to specific illustrative embodiments thereof many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A plug connector assembly for fiber optic cables, said plug assembly including in combination:
    a plug having a plug housing;
    a fiber optical cable attached to said plug, and having an end face with an optical center;
    said optical center having a rotational orientation with respect to a longitudinal axis of the fiber optic cable; and
    orientation means associated with said plug for maintaining the rotation position of said optical center in a fixed and predetermined relationship with said plug housing, said orientation means comprising a sleeve and a cylindrical ring nut;
    said sleeve being concentrically affixed to said plug and having a longitudinal ridge diametrically opposite from a longitudinal slot;
    said cylindrical ring nut being secured to said plug housing, said ring nut including a longitudinal bore with an interior surface;
    a plurality of longitudinal extending grooves in the interior surface of the bore of said cylindrical ring nut;
    wherein the longitudinal ridge of said sleeve is capable of sliding into one of said plurality of grooves; and
    connector means for threadingly securing said plug assembly to a screw-threaded receiving connection and for preventing over-tightening of said connector means onto said receiving connection:
    wherein said connector means includes a union nut having a cylindrical outer surface with an annular collar at each end, and a central longitudinal bore with interior threads at an end thereof remote from said plug housing, a friction clutch sleeve located between said annular collars and in only frictional contact with the cylindrical outer surface of said union nut, and means for rotating said connector means with respect to said ring nut and said plug housing to secure said interior threads to said screw-threaded receiving connection.

2. A plug connector assembly for fiber optic cables, said connector assembly including in combination:
    a first plug having a plug housing and secured to a first fiber optic cable having a first end-face with an optical center;
    a second plug having a plug housing and secured to a second fiber optic cable having a second end-face with an optical center;
    each of said optical centers having a rotational position with respect to a longitudinal axis of its corresponding fiber optic cable;
    connector means for securing said first and second plugs and their corresponding fiber optic cable end faces together; and
    orientation means associated with said connector means and said plugs for maintaining the rotational positions of said optical centers of said fiber optic cable end-faces in substantially coaxial alignment, said orientation means comprising a sleeve and a cylindrical ring nut;
    said sleeve being coaxially affixed to said plug and having a longitudinal ridge diametrically opposite from a longitudinal slot;

said cylindrical ring nut being secured to said plug housing, said ring nut including a longitudinal bore with an interior surface;

a plurality of longitudinally extending grooves in the interior surface of the bore of said cylindrical ring nut; and wherein the longitudinal ridge of said sleeve is capable of sliding into said at least on longitudinal groove; and connector means for threadingly securing said plug assembly to a screw-threaded receiving connection and for preventing over-tightening of said connector means onto said receiving connection;

wherein said connector means includes a union nut having a cylindrical outer surface with an annular collar at each end, and a central longitudinal bore with interior threads at an end thereof remote from said plug housing, a friction clutch sleeve located between said annular collars and in only frictional contact with the cylindrical outer surface of said union nut, and means for rotating said connector means with respect to said ring nut and said plug housing to secure said interior treads to said screw-threaded receiving connection.

3. A plug connector assembly for fiber optic cables, said plug assembly including in combination:

a plug having a plug housing;

a fiber optic cable attached to said plug, and having an end face with an optical center;

said optical center having a rotational orientation with respect to a longitudinal orientation means associated with said plug for maintaining the rotation position of said optical center in a fixed and predetermined relationship with said plug housing, said orientation means comprising a sleeve and a cylindrical ring nut;

said sleeve being concentrically affixed to said plug and having longitudinal ridge diametrically opposite from a longitudinal slot;

said cylindrical ring nut being secured to said plug housing, said ring nut including a longitudinal bore with an interior surface;

a plurality of longitudinal extending grooves in the interior surface of the bore of said cylindrical ring nut;

wherein the longitudinal ride of said sleeve is capable of sliding into one of said plurality of grooves; and connector means for threadingly secureing said plug assembly to a screw-threaded receiving connection and for preventing over-tightening of said connector means onto said receiving connection;

wherein said connector means includes a union nut having first and second ends, a cylindrical outer surface, and a central longitudinal bore, said longitudinal bore having interior threads at the first end of said union nut, said second end of said union nut including a plurality of radially spaced longitudinal apertures, said second end of said union nut including a raised annular surface interrupted by said apertures and of slightly greater diameter than said cylindrical outer surface, an annular cylindrical ratchet sleeve coaxially surrounding said union nut, said ratchet sleeve including resilient means for engaging the second end of the union nut and for rotating said connecting means in a tightening and a loosening direction with respect to said receiving connection.

4. The plug assembly of claim 3, further wherein said resilient means is resiliently biased circumferentially inwardly to frictionally engage the raised annular surface when rotating the connecting means in the tightening direction, and to extend into and engage said apertures when rotating the connecting means in the loosening direction.

5. The plug assembly of claim 4, further wherein said resilient means includes a plurality of resilient tabs formed adjacent to a plurality of slits in an end of said ratchet sleeve.

6. A plug connector assembly for fiber optic cables, said connector assembly including in combination:

a first plug having a plug housing and secured to a first fiber optic cable having a first end-face with an optical center; p1 a second plug having a plug housing and secured to a second fiber optic cable having a second end-face with an optical center;

each of said optical centers having a rotational position with respect to a longitudinal axis of its corresponding fiber optic cable;

connector means for securing said first and second plugs and their corresponding fiber optic cable end faces together; and orientation means associated with said connector means and said plugs for maintaining the rotational positions of said optical centers of said fiber optic cable end-faces in substantially coaxial alignement, said orientation means comprising a sleeve and a cylindrical ring nut;

said sleeve being coaxially affixed to said plug and having a longitudinal ridge diametrically opposite from a longitudinal slot;

said cylindrical ring nut being secured to said plug housing, said ring nut including a longitudinal bore with an interior surface;

a plurality of longitudinally extending grooves in the interior surface of the bore of said cylindrical ring nut; and wherein the longitudinal ridge of said sleeve is capable of sliding into said at least on longitudinal groove; and connector means for threadingly securing said plug assembly to a screw-threaded receiving connection and for preventing over-tightening of said connector means onto said receiving connection;

wherein said connector means includes a union nut having first and second ends, and cylindrical outer surface and a central longitudinal bore, said longitudinal bore having interior threads at the first end of said union unit, said second end of said union nut including a plurality of radially spaced longitudinal apertures, said second end of said union nut including a raised annular surface interrupted by said apertures and of slightly greater diameter than said cylindrical outer surface, an annular cylindrical ratchet sleeve coaxially surrounding said union nut, said ratchet sleeve including resilient means for engaging the second end of the union nut and for rotating said connecting means in a tighten ting and a loosening direction with respect to said receiving connection.

7. The plug assembly of claim 6 further wherein said resilient means is resiliently biased circumferentially inwardly and frictionally engage the raised annular surface when rotating the connecting means in the tightening direction, and to extend into and engage said apertures when rotating the connecting means in the loosening direction.

8. The plug assembly of claim 7, further wherein said resilient means includes a plurality of resilient tabs formed adjacent to a plurality of slits in an end of said ratchet sleeve.

* * * * *